United States Patent
Pitkämäki et al.

(10) Patent No.: US 8,363,639 B2
(45) Date of Patent: Jan. 29, 2013

(54) CALL INITIATION CONTROL

(75) Inventors: Antti Pitkämäki, Tampere (FI); Heli Kivistö-Rahnasto, Akaa (FI)

(73) Assignee: Nokia Corporation, Espoo (FI)

( * ) Notice: Subject to any disclaimer, the term of this patent is extended or adjusted under 35 U.S.C. 154(b) by 1253 days.

(21) Appl. No.: 11/643,683

(22) Filed: Dec. 22, 2006

(65) Prior Publication Data

US 2008/0152126 A1 Jun. 26, 2008

(51) Int. Cl.
*H04L 12/66* (2006.01)

(52) U.S. Cl. ............... 370/352; 455/435.2; 455/445; 455/552.1

(58) Field of Classification Search ................ None
See application file for complete search history.

(56) References Cited

U.S. PATENT DOCUMENTS

| | | | |
|---|---|---|---|
| 6,141,341 A * | 10/2000 | Jones et al. | 370/352 |
| 7,783,322 B2 * | 8/2010 | Pi et al. | 455/552.1 |
| 2002/0068609 A1 * | 6/2002 | Oh et al. | 455/560 |
| 2003/0002524 A1 * | 1/2003 | Feldman et al. | 370/465 |
| 2004/0192292 A1 * | 9/2004 | Chang et al. | 455/426.1 |
| 2004/0198425 A1 | 10/2004 | Mellone et al. | |
| 2004/0267936 A1 * | 12/2004 | Sagiv | 709/227 |
| 2005/0197061 A1 * | 9/2005 | Hundal | 455/41.2 |
| 2006/0109867 A1 * | 5/2006 | Souissi | 370/493 |
| 2007/0202915 A1 * | 8/2007 | Karaoguz | 455/550.1 |
| 2008/0101279 A1 * | 5/2008 | Russell et al. | 370/328 |
| 2009/0010246 A1 * | 1/2009 | Grattan et al. | 370/352 |

FOREIGN PATENT DOCUMENTS

| | | |
|---|---|---|
| EP | 1 517 575 A2 | 3/2005 |
| EP | 1 710 988 A2 | 10/2006 |

OTHER PUBLICATIONS

3rd Generation Partnership Project (3GPP); "Digital Cellular Telecommunications System (Phase 2+); Universal Mobile Telecommunications System (UMTS); AT Command Set for User Equipment (UE) (3GPP TS 27.007 version 6.8.0 Release 6)"; pp. 1-177; Mar. 2005.

Bluetooth Doc; "Hands-Free Profile Adopted Version 1.0"; XP-002330455; pp. 1-73; Apr. 29, 2003.

International Search Report, PCT/EP2007/062609, filed Nov. 21, 2007.

"Series V: Data Communication Over the telephone Network", Serial asynchronous automatic dialing and control, V. 250, ITU-T Telecommunication standardization sector of ITU, Jul. 2003, pp. 5-48.

3rd Generation Partnership Project; Technical Specification Group Core network and Terminals; AT command set for User Equipment (UE) (Release 7), 3GPP TS 27.007 V7.2.0, Sep. 2006, Global System for Mobile Communications, a total of 177 pages.

* cited by examiner

*Primary Examiner* — Brian Roberts
(74) *Attorney, Agent, or Firm* — Mintz Levin Cohn Ferris Glovsky and Popeo, P.C.

(57) ABSTRACT

A method for initiating a call is disclosed. In the method, after selection of a carrier type for the call, an attention command string including an indication of the selected carrier type is sent to a communication device from a device. The communication device may then initiate a call set-up procedure based on the indication of the selected carrier type included in the attention command string.

12 Claims, 3 Drawing Sheets

CALL INITIATION CONTROL

BACKGROUND OF THE INVENTION

1. Field of the Invention

The present disclosure relates to call initiation, and more particularly to call initiation commands for a communication device.

2. Description of the Related Art

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various applications.

A communication system, in turn, can be seen as a facility that enables communication sessions between two or more entities such as the communication devices, network entities and other nodes. In the simplest form a communication system comprises two communicating devices that are suitably configured for enabling the communication there between. In wider communication systems an appropriate access system allows communication devices to access to the communication system. An access to the communications system may be provided by means of a fixed line or wireless communication interface, or a combination of these user equipment and/or other nodes associated with the communication system.

A communication system typically operates in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how the communication device can access the communication system and how communication shall be implemented between the communication devices, the elements of the communication network and/or other communication devices is typically based on predefined communication protocols.

Communication systems proving wireless communication are known. These systems are typically referred to as mobile systems; although in certain systems the mobility may be restricted to substantially small areas. An example of the mobile systems is the public land mobile network (PLMN). Another example is a mobile system that is based, at least partially, on use of communication satellites. Mobile communications may also be provided by means of other types of systems, such as by means of wireless local area networks (WLAN) or short range radio or other wireless links.

In a typical mobile system a mobile communication device communicates via a station of the communication system, commonly referred to as a base station. A communication device may be in wireless communication with two or more stations at the same time. A communication device may also be configured to communicate on different carrier systems, i.e. may be adapted for operation in multi-radio environments.

A multi-mode or multi-radio communication device typically refers to terminal equipment adapted to operate in accordance with more than one communications standard and is thus capable for communication on at least two different carrier systems. An example of multimode-mode user equipment is a communication device that can be used for voice communication that is carried either on a circuit switched network or a packet switched network. Another example is a multi-mode mobile phone, for example a cellular phone that may communicate via at least one cellular system and at least one non-cellular system. Non-limiting examples of the cellular systems include $2^{nd}$ generation (2G) cellular systems, for example the GSM and the $3^{rd}$ generation (3G) cellular systems such as the 3GPP WCDMA. Examples of the non-cellular systems include short range links such as the short range radio link provided based on the Bluetooth™ protocols, various wireless local area networks (WLAN), local systems based on the Digital Video Broadcasting via Handheld Terminals (DVB-H) and ultra wide band (UWB) and so on.

A voice call may be carried by a circuit switched service or a packet switched service. For example, the Internet Engineering Task Force (IETF) has specified support for capabilities to have voice calls over the packet switched networks. An application thereof is known in public by the name Voice over IP (VoIP).

A user is typically enabled to choose if he is to have a circuit switched call or a packet switched call, such as a VoIP call. The user may wish to experience the use of the VoIP option to be as close to the circuit switched voice calls as possible. That is, the end user may expect that anything he can do with circuit switched voice calls he can also do with the VoIP. At least the initiation of a VoIP call instead of a circuit switched call should be as easy as possible.

A particular problem might occur when a user is controlling the call initiation via an external device, for example by means of a hands-free kit such as a headset. In such arrangements the external device needs to communicate appropriate call initiation commands to the communication device, for example a mobile phone. Current command interface specifications for the peripheral devices, however, are relatively limited and do not consider extensions such as selection of a VoIP voice call or selection of the carrier type at all. Instead, the current command mechanisms are designed for use with circuit switched voice calls only.

It is noted that the problem is not limited to devices for mobile communication systems, but may occur in any communication environment wherein a user may need to control the selection of the desirable carrier system at the call initiation stage.

SUMMARY

The herein described embodiments aim to address one or several of the above problems.

According to an embodiment, there is provided a method for initiating a call. In the method, based on selection of a carrier type for the call, an attention command string including an indication of the selected carrier type is communicated to a communication device. A call set-up procedure can then be initiated at the communication device based on the indication.

a device comprising a command generator configured to generate an attention command string including an indication of a selected carrier type for a call. The device also comprises an interface configured to send the attention command string to a communication device for instructing initiation of a call set-up by the communications device.

An embodiment provides communication device comprising an interface for receiving a command to initiate a call, the command comprising an attention command string including an indication of a selected carrier type. A call control part of the communication device is configured to initiate a call based on the attention command string.

In accordance with more particular embodiments the attention command string includes an indication if the call is to be set-up as a circuit switched call or a packet switched call. The indication may also be that the call is to be set-up as a short range link call.

The attention command string may be sent to a mobile station from an external device. The attention command string may comprise a dial-string modifier.

BRIEF DESCRIPTION OF DRAWINGS

For better understanding of the present invention, reference will now be made by way of example to the accompanying drawings in which.

DETAILED DESCRIPTION OF EMBODIMENTS

An exemplifying communication system wherein the invention can be embodied is now briefly explained. The communication system may be provided by a plurality of communication systems that are based on different standards. In a typical mobile communication network, for example the cellular public landline mobile network (PLMN), a number of cells is provided by means of base stations. Each base station is arranged to wirelessly transmit signals to and receive signals from a plurality of mobile communication devices, commonly referred to as user equipment. The wireless communication between the user equipment and cells can be based on any appropriate communication protocol and access technology. Non-limiting examples include access based on systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

Before explaining in detail some exemplifying embodiments, certain general principles of a wireless communication device are also briefly explained with reference to FIG. 1. A wireless communication device can be used for accessing various services and/or applications via a wireless or radio interface. A wireless device can typically communicate wirelessly via at least one base station or similar wireless transmitter and/or receiver node or directly with another wireless communication device. Each wireless device may have one or more radio channels open at the same time and may have communication connections with more than one other parties. A wireless device is typically able to move within a radio access area and also from one area to another, and hence these devices are often called mobile devices.

Figure 1:
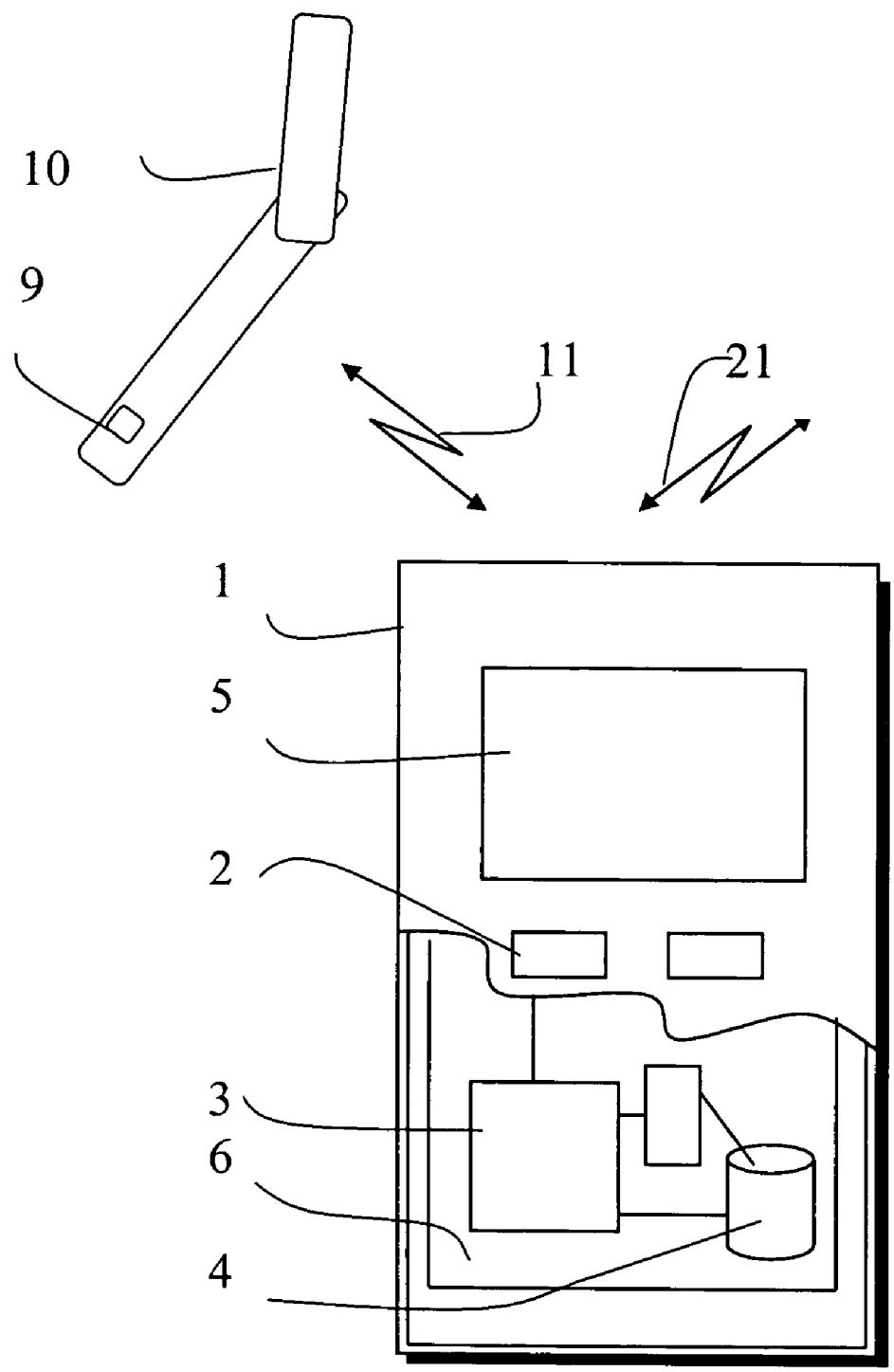
FIG. 1 shows a schematic presentation of a communication device and external device pair where the invention may be embodied.

FIG. 1 shows a schematic partially sectioned view of such a wireless device 1. The mobile device 1 of FIG. 1 can be used for various tasks such as making and receiving phone calls, for receiving and sending data from and to a data network and for experiencing, for example, multimedia or other content. Non-limiting examples include a mobile station (MS), a portable computer provided with a wireless interface card or other wireless interface facility, personal data assistant (PDA) provided with wireless communication capabilities, or any combinations of these or the like.

An appropriate wireless communication device is provided with required radio transmission elements and controller functions so that it is enabled to communicate wirelessly, and process control instructions it may receive or send. A multi-mode mobile user equipment is able to communicate via a plurality of different carrier systems. In the herein described embodiment a multi-mode mobile user equipment 1 is capable of setting up a circuit switched call on a 2G carrier and a packet switched call on a 3G carrier. Such a communication device may comprise, for example, a dual-mode (WCDMA/GSM) mobile user equipment. The wireless device 1 may also communicate over short range radio links such as a Bluetooth™ link.

The device 1 may communicate via an appropriate radio interface arrangement of the mobile device. The interface arrangement typically comprises an antenna element. The antenna may be arranged internally or externally to the device. A wireless communication device is typically also provided with at least one data processing entity 3 and at least one memory 4 for use in tasks it is designed to perform. The data processing and storage entities can be provided on an appropriate circuit board and/or in chipsets. This feature is denoted by reference 6. The user may control the operation of the device 1 by means of a suitable user interface such as key pad 2, voice commands, touch sensitive screen or pad, combinations thereof or the like. A display 5, a speaker and a microphone are also typically provided. Furthermore, a wireless device may comprise appropriate connectors (either wired or wireless) to other devices and/or for connecting external devices, for example hands-free equipment, thereto.

The mobile device 1 may be enabled to communicate on a number of different carrier systems. This capability is illustrated in FIG. 1 by the two wireless signals 11 and 21.

FIG. 1 shows further an external device 10 that may communicate with the communication device 1. In the example the communication may be provided over a Bluetooth™ link. The external device 10 may be, for example, a wireless hands-free headset. The device is provided with a user interface to enabled the user thereof to control operation thereof and/or the communication device. In the example of FIG. 1 a control button 9 is provided, but it is noted that the user interface may be provided by any suitable mechanism, for example a voice activation arrangement.

In the below described examples the external device is provided with a mechanism to command a communication device to set-up a call based on the selection of the user. In an embodiment attention commands (AT commands) are used for controlling the communication device. More particularly, dial-string modifiers of an attention command may be used to distinguish between calls that are carried as circuit switched calls and VoIP calls.

Figure 2:
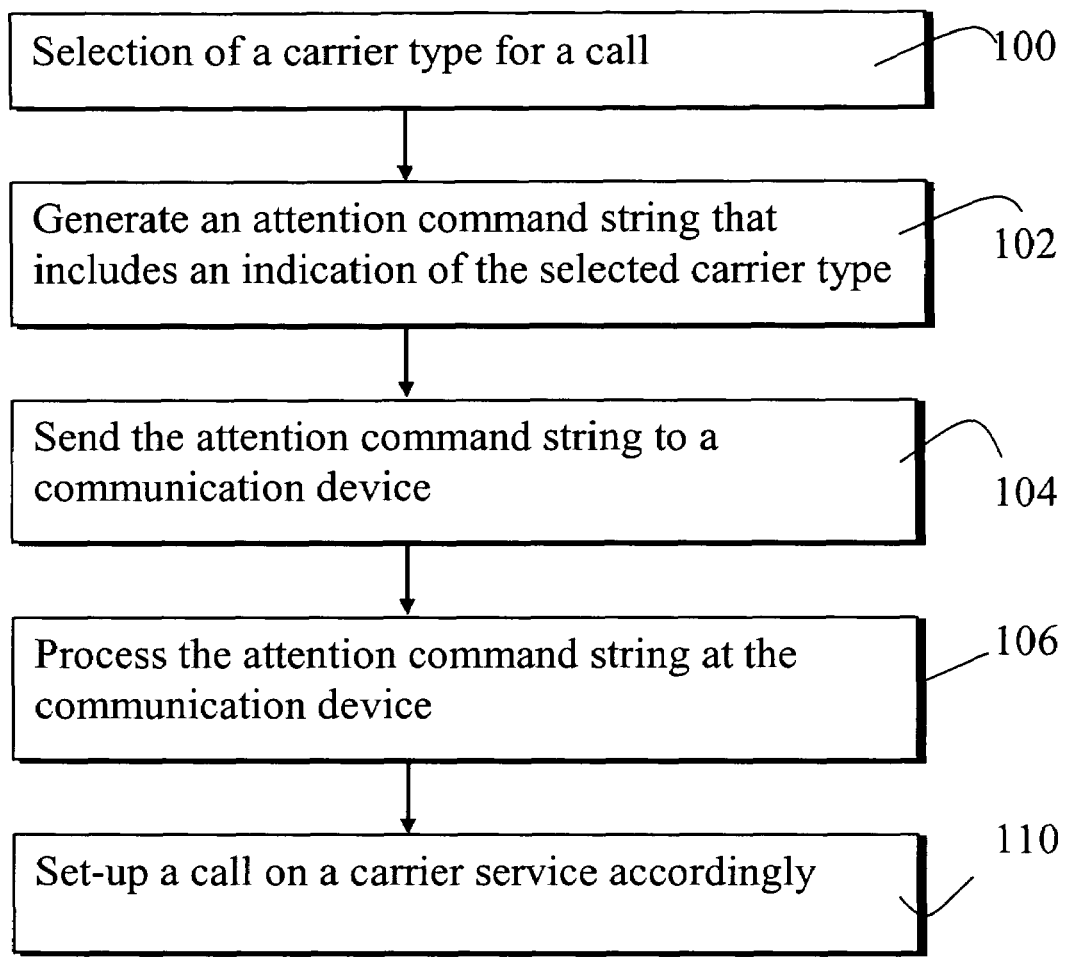
FIG. 2 is a flowchart illustrating an embodiment of the invention.

An example of this is illustrated in the Flowchart of FIG. 2. At 100, a user who wants to initiate a call may select a carrier type for the call by an appropriate input action. For example, the user may use an appropriate voice command to input selection of a circuit switched call or a packet switched call. A command generator of the input device may then generate an attention command string and include therein an indication of the selected carrier type at 102. For example, the attention command string may include an indication that the call is to be set-up as a circuit switched call or a packet switched call. The packet switched call may be defined as being a voice over internet protocol (VoIP) call.

According to an embodiment the attention command string included an indication that the call is to be set-up as a short range link call, for example as a short range radio link call between two communication devices. Such call may be made between devices that are close enough to each other for direct communication, for example over an infrared link or a Bluetooth link.

The command string is then sent to a communication device at 104. The communication device receives the attention command string and processes it at 106 to detect the desired carrier type. A call is then set-up accordingly at 110.

Figure 3:
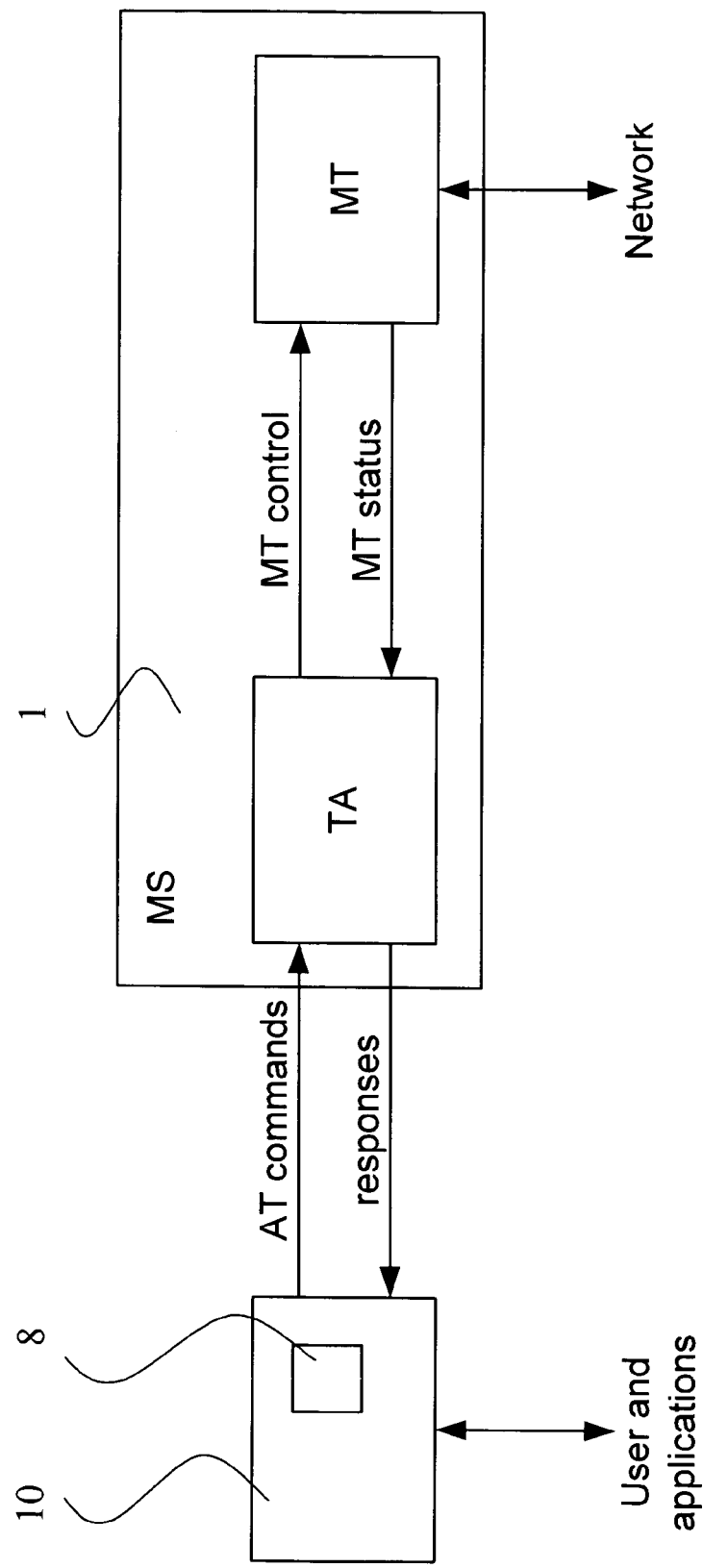
FIG. 3 shows a reference architecture for communications in relation to attention commands.

FIG. 3 is a schematic presentation of an external device—communication device pair, and shows an attention (AT) command reference architecture. In the exemplifying architecture the external device 10 communicates with a terminal adaptor (TA) of the communication device 1 based on instructions received from the users and/or various applications. The commands are generated by a command generator 8 of the device 10, the command generator being configured to generate an attention command string including an indication of a selected carrier type for a call. The terminal adaptor may then communicate with appropriate components of the communication device such as the radio part of a mobile terminal (MT) to activate a desired carrier service based on the attention commands received from the external device 10.

Attention commands (AT commands) are textual strings that can be passed over an interface between an external device and a communication device. For example, attention commands may be passed between an accessory of a mobile station (MS) such as a hand free kit and the mobile station. A Bluetooth enabled device may send attention commands to provide functionalities such as last number redial, activation of voice recognition for dialling and answering.

Originally AT commands were introduced for modem control. The format of the attention (AT) commands is explained for example in 3GPP Technical Specification 27.007, v7.2.0 of September 2006, Chapter 4, see in particular in section 4.1 explaining the command line syntax. Each attention command includes a two-character abbreviation AT that is used to start a command line to be sent to the communication device, followed by appropriate characters to provide a desired commanding functionality. In the current AT command interface, there are two main call modes, i.e. voice and data call. These two call modes are distinguished so that when voice call is desired, a semicolon (;) is added to the end of the command. In 3GPP specifications, there is also an AT command +CMOD, which can be used to set the mode of the subsequent call. However, this command does not contain any possibility for anything other than circuit switched calls.

The dial string modifiers are used for distinguishing between tone and pulse dialling. For example, if the caller wanted to call to number 123 with pulse dialling, the command line would be 'ATDP123;'. If the caller wanted to use tone dialling, the command line would be 'ATDT123;'. This concept, however, has not been used in the cellular systems, for example in GSM/UMTS. A reason for this is that in such systems the signalling is carried in digital format using messages, and therefore pulse and tone dialling cannot be applied in network level in a meaningful manner.

A similar mechanism may be used for distinguishing between circuit switched (CS) voice calls and packet switched (PS) voice calls, for example VoIP calls. For example, if a user wants to create a CS voice call to number 123, the command line would be, assuming for example that letter 'S' is used for CS voice calls, 'ATDS123;'. If the user wants to create a VoIP call to TEL URI 123, the command line would be, assuming for example that letter 'V' is used for VoIP calls, 'ATDV123;'.

It is noted that the characters S and V of the above example are chosen so that they do not conflict with the existing dial string modifiers. This solution can be kept backwards compatible by defining that string 'ATD123;', i.e. string without modifiers causes creation of call of type determined by the mobile communication device.

A possibility to implement the above example is to set the communication device such that it allows setting of a default call type, for example a CS voice call or VoIP call. The modifiers may then be used to override the setting.

The required data processing functions may be provided by means of one or more data processors. Thus the above described data processing functions of a communication device may be provided by separate processors or by an integrated processor. For example, data processing may be provided in a central processing unit of a communication device, or distributed across several data processing modules.

An appropriately adapted computer program code product or products may be used for implementing the embodiments, when loaded on an appropriate processor, for example in a processor of the communication device and/or an external device. The program code means may, for example, perform the generation and/or interpretation of the indication of a selected carrier type, determine the suitability of the selected carrier type, select a carrier type, generation of messages and so forth. The program code product for providing the operation may be stored on and provided by means of a carrier medium such as a carrier disc, card or tape. A possibility is to download the program code product to the communication device via a data network.

An advantage of the illustrative embodiments is that no new commands are needed between an external device and a communication device. The embodiments are also backwards compatible, since the technical specifications and standards do not forbid the introduction of proprietary dial string modifiers. Also, a syntactically erroneous command does not cause any action.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   receiving a selection of a carrier type for a wireless call; and
   sending from an external device via a short range wireless link to a mobile station an attention command string including a dial string modifier to indicate the selected carrier type to enable initiation at the mobile station of a wireless call set-up procedure based on the dial string modifier included in the attention command string.

2. The method of claim 1, wherein the dial string modifier indicates the wireless call is to be set-up as at least one of a circuit switched wireless call and a packet switched wireless call,
   wherein the packet switched wireless call comprises a voice over internet protocol wireless call,
   wherein the short range wireless link comprises a Bluetooth link.

3. The method of claim 1, wherein the sending further comprises sending the attention command string including the dial string modifier to indicate that the wireless call is to be set-up as a short range link wireless call.

4. The method of claim 1, wherein the dial string modifier includes a first dial string modifier representative of a circuit switched wireless call and a second dial string modifier representative of a packet switched wireless call.

5. The method of claim 1, wherein the selection of the carrier type comprises detection of a voice command.

6. An apparatus, comprising:
- a command generator configured to generate an attention command string including a dial string modifier to indicate a selected carrier type for a wireless call; and
- an interface configured to send the attention command string including the dial string modifier to a short range wireless link and a mobile station to enable initiation of a wireless call set-up by the mobile station, wherein the command generator and the interface are implemented on at least one processor.

7. The apparatus of claim 6,
- wherein the dial string modifier indicates the wireless call is to be set-up as at least one of a circuit switched wireless call and a packet switched wireless call,
- wherein the packet switched wireless call comprises a voice over internet protocol wireless call.

8. The apparatus of claim 6, wherein the command generator is configured to include in the attention command string the dial string modifier to indicate that the wireless call is to be set-up as a short range link wireless call.

9. The apparatus of claim 6, wherein the apparatus comprises a hands-free device.

10. The apparatus of claim 6, comprising a voice command detector implemented in at least one processor.

11. An apparatus, comprising:
- an interface, at a mobile station, configured to receive, from a short range wireless link, a command to initiate a wireless call, wherein the command comprises an attention command string including a dial string modifier to indicate a selected carrier type; and
- a wireless call control part, at the mobile station, configured to initiate the wireless call based on the attention command string including the dial string modifier, wherein the interface and the wireless call control part are implemented on at least one processor.

12. A system comprising:
a mobile station; and
an external device, wherein the external device is configured to communicate with the mobile station via a short range wireless link there between, and wherein the external device comprises:
- a command generator configured to generate an attention command string including a dial string modifier to indicate a selected carrier type for a wireless call; and
- an interface configured to send the attention command string including the dial string modifier to the mobile station for instructing initiation of a wireless call set-up by the mobile station, wherein the mobile station comprises:
- an interface for receiving, via the short range wireless link, the attention command string including the dial string modifier; and
- a wireless call control part configured to initiate the wireless call based on the attention command string including the dial string modifier,
- wherein the wireless call control part and the command generator are each implemented in at least one processor.

* * * * *